(12) United States Patent
Look

(10) Patent No.: US 7,510,125 B2
(45) Date of Patent: Mar. 31, 2009

(54) MULTI-DIMENSIONAL SYMBOLOGIES AND RELATED METHODS

(75) Inventor: Thomas F. Look, Ham Lake, MN (US)

(73) Assignee: Veritec, Inc., Golden Valley, MN (US)

( * ) Notice: Subject to any disclaimer, the term of this patent is extended or adjusted under 35 U.S.C. 154(b) by 0 days.

(21) Appl. No.: 11/818,112

(22) Filed: Jun. 13, 2007

(65) Prior Publication Data

US 2008/0035730 A1  Feb. 14, 2008

Related U.S. Application Data

(60) Provisional application No. 60/813,769, filed on Jun. 14, 2006.

(51) Int. Cl.
G06K 19/06 (2006.01)
(52) U.S. Cl. .................................... 235/494
(58) Field of Classification Search ............. 235/494, 235/460, 462.07, 462.09, 462.1
See application file for complete search history.

(56) References Cited

U.S. PATENT DOCUMENTS

| | | | |
|---|---|---|---|
| 2,612,994 A | 10/1952 | Woodland et al. | |
| 4,924,078 A | 5/1990 | Sant' Anselmo et al. | |
| 4,972,475 A | 11/1990 | Sant' Anselmo | |
| 5,331,176 A | 7/1994 | Sant' Anselmo et al. | |
| 5,568,555 A * | 10/1996 | Shamir | 380/51 |
| 5,612,524 A | 3/1997 | Sant' Anselmo et al. | |
| 6,070,805 A | 6/2000 | Kaufman et al. | |
| 2005/0269417 A1 | 12/2005 | Wood | |
| 2006/0180672 A1* | 8/2006 | Chu | 235/487 |

* cited by examiner

Primary Examiner—Daniel A Hess
(74) Attorney, Agent, or Firm—Kagan Binder, PLLC

(57) ABSTRACT

Multi-dimensional symbology codes that use plural characteristic features encoded in a data cell and related methods. Such methods include methods of encoding, methods of creating and methods of reading multi-dimensional symbology codes that use such plural characteristic features. The features, for example, include colors, grey scale levels, cell shape, patterns within a cell or any grouping discernable by an area array camera or similar device.

17 Claims, 3 Drawing Sheets
(2 of 3 Drawing Sheet(s) Filed in Color)

MULTI-DIMENSIONAL SYMBOLOGIES AND RELATED METHODS

CROSS-REFERENCE TO RELATED APPLICATION

The present application claims priority to U.S. Provisional Application No. 60/813,769, filed Jun. 14, 2006, the contents of which are incorporated herein by reference in its entirety for all purposes.

TECHNICAL FIELD

The present invention relates to methods for encoding and decoding information. In particular, the present invention relates to multi-dimensional matrix coding technology.

BACKGROUND

Modern bar code work began in 1948. On Oct. 20, 1949, Woodland and Silver filed a patent application entitled "Classifying Apparatus and Method." The inventors described their invention as relating "to the art of article classification . . . through the medium of identifying patterns." Woodland and Silver bar code was a bull's eye symbol, a symbol made up of a series of concentric circles. Woodland and Silver also described a straight-line pattern quite similar to present day one-dimensional bar codes. The symbology was made up of a pattern of four white lines on a dark background. The first line was a datum line and the positions of the remaining three lines were fixed with respect to the first line. The information was coded by the presence or absence of one or more of the lines. This allowed 7 different classifications of articles. However, the inventors noted that if more lines were added, more classifications could be coded. For example, with 10 lines, 1023 classifications could be coded. The Woodland and Silver patent application was issued Oct. 7, 1952 as U.S. Pat. No. 2,612,994, the entire disclosure of which is incorporated by reference herein for all purposes.

Bar codes were not commercialized until 1966. The first commercialized product codes were represented by bull's-eye barcodes, and included a set of concentric circular bars and spaces of varying widths. It was soon recognized that the industry would have to agree on a standard coding scheme open to all equipment manufacturers to use and adopted by all food producers and dealers. In 1969, the NAFC asked Logicon, Inc. to develop a proposal for an industry-wide bar code system. The result was Parts 1 and 2 of the Universal Grocery Products Identification Code (UGPIC) in the summer of 1970. Based on the recommendations of the Logicon report, the U.S. Supermarket Ad Hoc Committee on a Uniform Grocery Product Code was formed. Three years later, the Committee recommended the adoption of the UPC symbol set still used in the USA today.

The first attempt at an industrial application of automatic identification was begun in the late 1950's by the Association of American Railroad. In 1967, the Association adopted an optical bar code. Car labeling and scanner installation began on Oct. 10, 1967. It took seven years before 95% of the fleet was labeled. For many reasons, the system simply did not work and was abandoned in the late 1970's. An important event that really got the bar code into industrial applications occurred Sep. 1, 1981 when the United States Department of Defense adopted the use of Code 39 for marking all products sold to the United States military. This system was called LOGMARS.

A linear bar code is a binary code. The lines and spaces are of varying thicknesses and printed in different combinations. To be scanned, there must be accurate printing and adequate contrast between the bars and spaces. Scanners employ various technologies to read codes. The two most common are lasers and cameras. Scanners may be fixed position, like most supermarket checkout scanners, or hand-held devices, often used for the taking of inventories. There should be (but typically is not) a distinction drawn between the code, which is a structure for the conveyance of data, and the symbol, the machine-readable representation of the code. The code is text, which can be translated into a multiplicity of languages such as English, French, Japanese, or symbol.

Notwithstanding its inauspicious beginning, the bar code has become a remarkable success, a workhorse in many and varied applications. One of the first successful bar codes, Code 39 developed by Dr. David Allais, is widely used in logistical and defense applications. Code 39 is still in use today, although it is less sophisticated than some of the newer bar codes. Code 128 and Interleaved 2 of 5 are other codes that attained some success in niche markets.

The mapping between messages and barcodes is called a symbology. The specification of a symbology includes the encoding of the single digits/characters of the message, as well as, the start and stop markers into bars and spaces, the size of the quiet zone required to be before and after the barcode as well as the computation of a checksum or error correction.

Linear symbologies can be classified generally according to two properties: (1) continuous or discrete and (2) two-width or multiple-width. Characters in continuous symbologies abut, with one character ending with a space and the next beginning with a bar, or vice versa. Characters in discrete symbologies begin and end with bars; the intercharacter space is ignored, as long as it is not wide enough to look like the code ends. Bars and spaces in two-width symbologies are wide or narrow; how wide a wide bar is exactly has no significance as long as the symbology requirements for wide bars are adhered to (usually two to three times more wide than a narrow bar). Bars and spaces in multiple-width symbologies are all multiples of a basic width called the module; most such codes use four widths of 1, 2, 3 and 4 modules. Stacked symbologies consist of a given linear symbology repeated vertically in multiple.

There are various two-dimensional symbologies. The most common are matrix codes, which feature square or dot-shaped modules arranged on a grid pattern. Two-dimensional symbologies also come in a variety of other visual formats. Aside from circular patterns, there are several two-dimensional symbologies which employ steganography by hiding an array of different-sized or shaped modules within a user-specified image such as DataGlyph, for example. Steganography is the art and science of writing hidden messages in such a way that no one apart from the intended recipient knows of the existence of the message; this is in contrast to cryptography, where the existence of the message itself is not disguised, but the content is obscured.

Linear symbologies are optimized to be read by a laser scanner, which sweeps a beam of light across the barcode in a straight line, reading a slice of the barcode light-dark patterns. Stacked symbologies are also optimized for laser scanning, with the laser making multiple passes across the barcode. Laser scanners uses a polygonal mirror or galvanometer-mounted mirror to scan a laser across the barcode, initially only in a straight line, but eventually in complicated patterns so the reader can read barcodes at any angle. Two-dimensional symbologies cannot be read by a laser as there is typically no sweep pattern that can encompass the entire symbol. Accordingly, two-dimensional symbols are typically scanned by a camera capture device.

In the 1990's some barcode reader manufacturers began working with digital cameras to capture barcodes, both linear and two-dimensional. That technology has since been perfected and now often surpasses laser scanners in performance and reliability. More recently, off-the-shelf digital cameras have enough resolution to capture both one-dimensional and two-dimensional barcodes. Increasingly companies are looking to incorporate barcode scanning software into camera phones. However, the camera phone optics are not well suited for standard codes that were designed for industrial dedicated scanners. As a result, new codes are being designed for mobile phones.

Bar codes and particularly two-dimensional symbology codes are designed to hold data. Code users continue to require increased data and the codes holding that data need to provide an increase in the volume of data held in the code. This need drives those who supply these codes to increase data capacity. There are fundamental technical problems that make the increased code data both difficult to create and print and difficult to read and extract the information. Increased levels of data normally requires an increased quantity of symbol cells within the code to hold that data. This increase can be accomplished by creating a code that uses a larger area or by making the symbol cells within the code smaller.

One method of providing increased levels of data normally requires an increased area to hold that data. Most bar/dot codes are printed on a substrate. Some are also read from an LCD or other data monitors such as mobile phone screens. The issues of printing or writing a larger code to the readable media are well known. For example, the media may be small such as a driver's license where no additional area is available for a larger code. Also, the code user typically does not want the media marketing appeal lessened by a large sometime obtrusive code. The physical size of electronic media may not be large enough to hold a larger code. A mobile phone is an example of a small area screen that may not be able to hold a larger code.

Other methods to increase data capacity also have issues in adding symbols by decreasing the size of each symbol's cell. In particular, the printed media may not be capable of accepting the increased resolution required for displaying smaller symbols that are readable. Most printed media has limited DPI (Dots Per Inch) or resolution and smaller symbols may not be formed well enough to be readable. Also, LCD and other electronic media are even more limited in DPI and have a fixed number of pixels to display elements. Smaller codes cells are often hard to correctly image in the reader camera.

The two-dimensional codes are typically read by area array camera devices that have light sensitive elements organized in an array that contains elements in orthogonal X and Y axes or, a drive motor that moves the code under a single row of elements. Reading higher density two-dimensional symbology codes can be challenging. Where you use a larger area code or smaller but more dense symbols, the number of camera elements that fall on any particular cell is less than for a smaller or less dense code. The more elements that image any particular cell, the more likely the cell binary code will be read correctly. The larger code will necessitate filling more of the camera array in order to read the code. As you fill more of the imager and move away from the center of the array the camera lens has more distortion and therefore the image will not be as accurate on the outside edges. As the code has more cells to read the total data being analyzed becomes larger and takes more time based on the increased number of elements that will be analyzed.

One commonly used area array camera has an array of 640×480 (307,200) elements and typically can be used to read a code with up to 800 bytes of data. The code of choice for high data content is the currently commercially available two-dimensional VSCode™ symbology by Veritec Inc. VSCode™ symbols of 1200 byte capacity generally do not read as well as other lower data codes using a camera with the above noted characteristics. A 1.3 mega-element camera can be used for the 1200 byte code but increased work load/read time from using quadruple the elements, a more costly camera and less image stability all contribute to challenges in reading larger codes. The large data two-dimensional codes are reaching the practical maximum data capacity for current technology when cost, complexity and read speed are also considered. Moreover, a code two-dimensional code is still limited by the fact that each cell within a symbology is limited by the binary function of having only black and white cells that provides only 2 bits of data per cell.

SUMMARY

The present invention provides multi-dimensional symbology codes that use plural characteristic features encoded in a data cell and related methods. Such methods include methods of encoding, methods of creating and methods of reading multi-dimensional symbology codes that use such plural characteristic features. The features, for example, include colors, grey scale levels, cell shape, patterns within a cell or any grouping discernable by an area array camera. Using more than one feature increases data content, within a cell, by the multiple of the number of features within each feature divided by 2. The present invention also comprises methods of finding the code in the field of view, correcting the code for optical distortion, correcting the camera output by recalibration from known features in a known location and methods of using an array area camera for reading such symbols.

The present invention provides methods to extract more than two bits of data from each symbol cell without requiring more area array camera elements, camera complexity, cost or time to extract data from the cell. That is, the present invention provides the ability to realize increasing data bits from a single cell by creating the cell from differing optically readable designs and colors or combinations thereof in any combination or array that provides more than two data bits per cell.

In one aspect of the present invention, a multi-dimensional matrix symbol comprising a plurality of data cells is provided. At least one data cell preferably comprises plural characteristic features and each characteristic feature represents an encoded data bit. Exemplary characteristic features include color, grey scale level, shape, and geometric pattern. The plurality of data cells are preferably arranged in an internal data field and the symbol may optionally further comprises a data cell border comprising a plurality of data cells surrounding the internal data field. At least one data cell of the data cell border preferably comprises plural characteristic features and each characteristic feature represents an encoded data bit.

In another aspect of the present invention, a multi-dimensional matrix symbol comprising an internal data field comprising a first plurality of data cells and a data cell border comprising a second plurality of data cells is provided. At least one data cell of the second plurality of data cells comprises plural characteristic features and each characteristic feature represents an encoded data bit. In an aspect of the present invention, the first plurality of data cells comprises binary data cells.

In another aspect of the present invention, a method of reading a multi-dimensional matrix symbol is provided. The method comprising the steps of providing a multi-dimensional matrix symbol comprising a plurality of data cells wherein at least one data cell comprises plural characteristic features and each characteristic feature represents an encoded data bit, identifying each characteristic feature of each data cell, and decoding the data represented by each characteristic feature. The plurality of data cells of the multi-dimensional symbol are preferably arranged in an internal data field and the symbol further preferably comprises a data cell border comprising a plurality of data cells surrounding the internal data field. Another aspect of the present invention comprises locating the symbol by identifying at least a portion of the data cell border. Yet another aspect of the present invention comprises orienting the symbol by identifying at least a portion of the data cell border.

In another aspect of the present invention, a method of reading a multi-dimensional matrix symbol is provided. The method comprises the steps of providing a multi-dimensional matrix symbol comprising an internal data field comprising a first plurality of binary data cells and a data cell border comprising a second plurality of multi-dimensional data cells wherein at least one data cell of the second plurality of data cells comprises plural characteristic features and each characteristic feature represents an encoded data bit, decoding data represented by the first plurality of binary data cells, identifying each characteristic feature of each data cell of the second plurality of data cells, and decoding the data represented by each characteristic feature. Another aspect of the present invention comprises locating the symbol by identifying at least a portion of the data cell border. Yet another aspect of the present invention comprises orienting the symbol by identifying at least a portion of the data cell border.

Another aspect of the present invention is directed to the use of an area array camera method that can read codes in accordance with the present invention with increased capability as compared to current codes and readers using the unique aspects of the codes of the present invention.

Multi-dimensional symbols and methods of the present invention provide many advantages over conventional two-dimensional symbols. For example, borders are typically used to locate a symbol in the field of view and to correct issues of rotation and skew of a reader to the code substrate thereby allowing for omni directional or orientational code reading and typically comprise a black line in known two-dimensional codes. Aspects of the present invention provide borders with novel and unique identities as compared to a black line and provide features in known locations that can be used to help correct optical distortion. Timing marks within symbols of the present invention can be easier to locate and identify and be more accurate compared to black only cells of conventional data cells providing better locations for the symbol cells as compared to other two-dimensional symbology codes. A more complex structure of layered information allows encoding algorithms with greater security based on the arrangement of data among many features. For codes that only require 800 or 1200 bytes of information, codes of the present invention, for example, can be made with less than 1% of the area compared to the existing, industry accepted construction while keeping the same cell size or with much larger cells making the reading easier and more tolerant to optical errors. Speed of reading for each cell of information is much faster because a 24 bit element group output that falls on a cell, for example, can have up to 256 bits of useful information compared to 2 bits as with the industry accepted construction.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The accompanying drawings, which are incorporated in and constitute a part of this application, illustrate several aspects of the invention and together with description of the embodiments serve to explain the principles of the invention. A brief description of the drawings is as follows.

DETAILED DESCRIPTION

Figure 1:
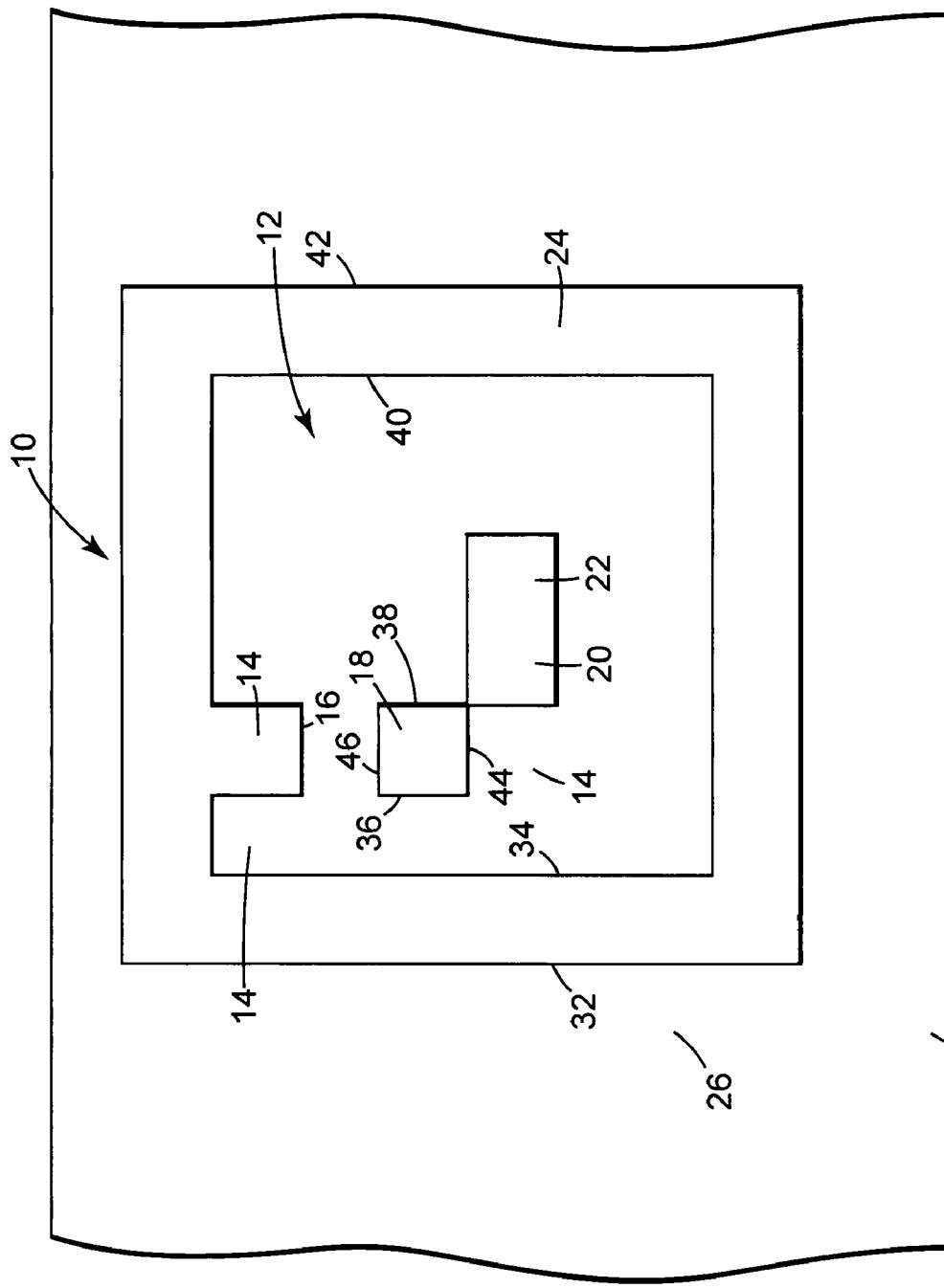
FIG. 1 is an exemplary two-dimensional symbol shown on a substrate and showing in particular an internal data field of the symbol comprising a plurality of data cells.

Area symbologies are well known, such as are described in U.S. Pat. No. 5,612,524, U.S. Pat. No. 4,972,475, and U.S. Pat. No. 4,924,078, the entire disclosures of which are incorporated herein by reference for all purposes. A typical symbol 10 from such an area symbology is illustrated in FIG. 1. Generally, the symbol 10 includes an internal data field 12 with internal data cells 14 arranged in a matrix, which data field 12 and data cells 14 are preferably rectangular as illustrated, although any other shapes are contemplated. As shown, the internal data field 12 has certain data cells 14 that are "on" and certain data cells 14 that are "off." As shown, the "on" cells are black (the cells designated by reference numerals 16, 18, 20, and 22) while the "off" cells are white (the remaining cells of the internal data field 12). Such on and off designations are used in decoding a symbol such as the symbol 10. It is understood that any binary designation may be used for differentiating between data cells 14 including on and off, 0 and 1, as well as black and white.

As illustrated, the internal data field 12 is preferably surrounded by an orientation and/or timing data cell border 24, which is typically used for timing and symbol orientation. The border is typically formed from "on" data cells as illustrated. An external data field 26 surrounding the border 24 may be provided, which may include external data cells (not shown) for providing additional information on orientation, timing or symbol identification. Preferably, surrounding the border 24 or the external data field 26, if provided, is a quite zone equivalent to one or more concentric rectilinear rings of "off" data cells surrounding the outermost pattern of "on" cells. The required number of concentric rectilinear rings of the quite zone may be determined by the environmental factors of symbol usage. Alternatively, the external data field 26 can act as a quiet zone or can be surrounded by a further quiet zone.

The symbol 10 may be formed directly on a substrate 28 such as by printing or controlled deposition of inks or other coatings, or may be provided onto a sticker or label by printing or any other suitable technique and then adhered or otherwise attached to a substrate.

The principles of the present invention may be applied to any symbol from any linear or stacked area, or other symbology, and preferably those symbols formed as area relief patterns, as discussed below. An area symbology, as used herein, refers to any symbology, such as those commercially known under the tradenames Vericode™ or Data Matrix™ or Code One™ or the like, that employs a matrix of data cells, rather than one or more rows of bars and spaces. A stacked symbology, as used herein, refers to any symbology, such as PDF 417, that generally employs several adjacent rows of symbols, each row having several characters defined by groups of multiple-width bars and spaces.

As used herein a symbol generally means a matrix of cells that contains encoded data within the cell features and organization. A matrix is an organized pattern of cells. A cell is a single component in the matrix that has features that holds encoded data. A feature comprises various attributes or elements applied to the cell structure such as color, grey scale, shape, pattern, or special optical ink. Preferably, features can be defined in software algorithms as separate entities, printed by digital color printers as separate entities, and/or imaged by a color digital camera and output as separate entities.

Codes and symbols in accordance with the present invention not only increase data content but allow many new methods of encoding and decoding to be practiced to add security; increase data correction inside a cell symbol or code; increase readability by the known placement of feature types and elements within a type; and, countless other improvements that were not possible with two bit cells.

Figure 2:
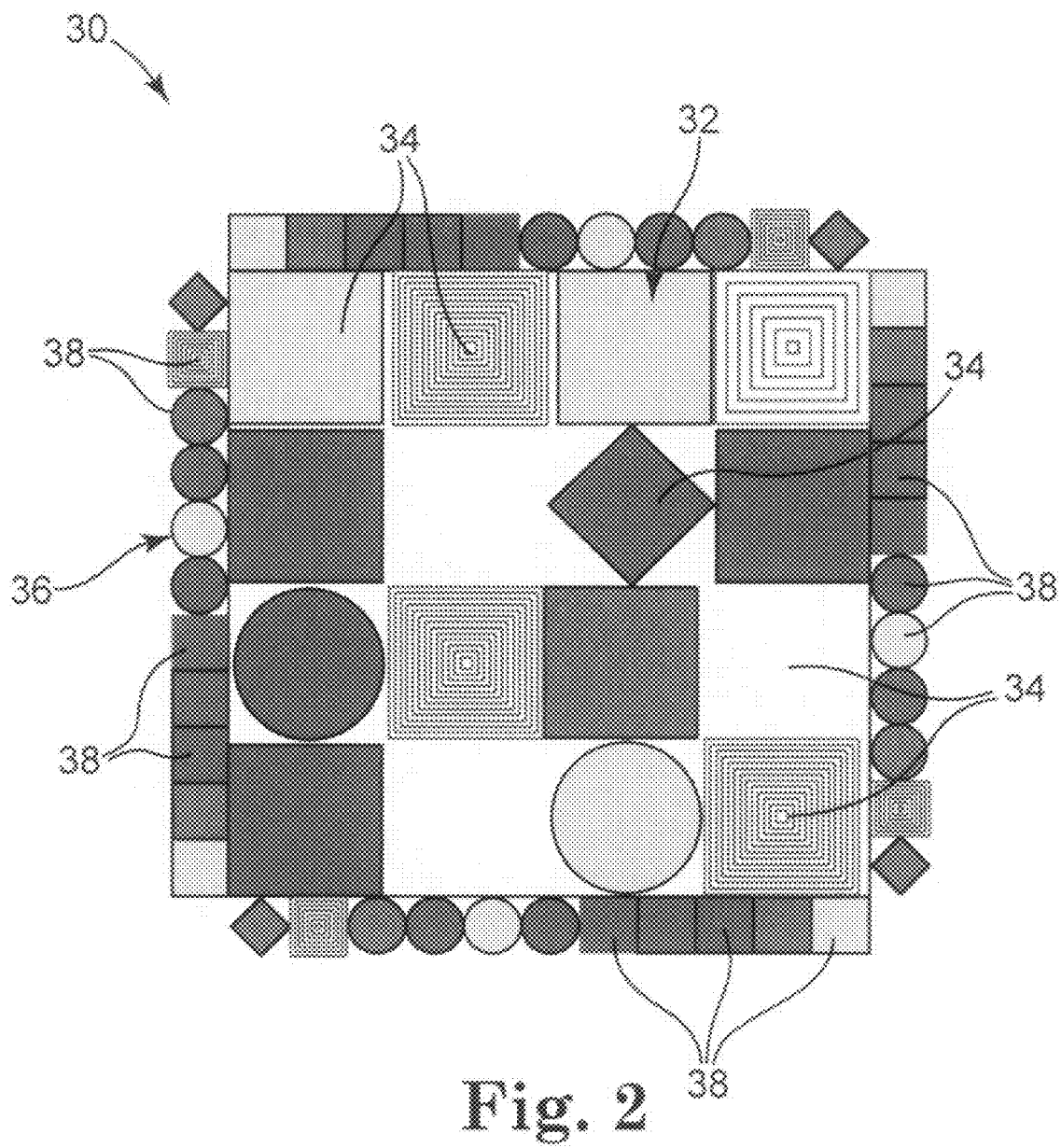
FIG. 2 is a schematic view of an exemplary multi-dimensional matrix symbol in accordance with the present invention.

Referring to FIG. 2 an exemplary multi-dimensional symbol 30 in accordance with the present invention is schematically shown. The symbol 30 comprises an internal data field 32 comprising a matrix of data cells 34 and an orientation and/or timing data cell border 36 of data cells 38.

As shown, the data cells 34 of the internal data field 32 comprise multi-dimensional data cells but may comprise binary data cells (black and white, for example). Also, as shown, the data cells 38 of the data cell border 36 comprise multi-dimensional data cells but may also comprise binary data cells if desired. As used herein, multi-dimensional data cell means a data cell comprising plural characteristic features each representative of a data bit and wherein the data cell is encoded with more than 2 bits of data.

Figures 3, 4, 5, 6:
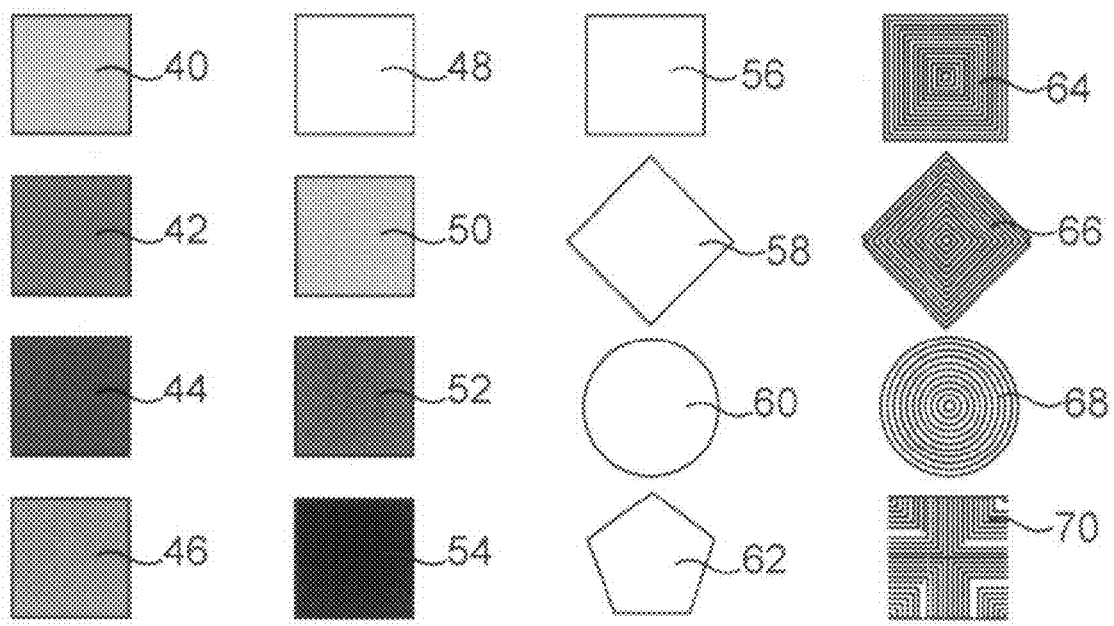
FIG. 3 is a schematic view of exemplary data cells each having a different color that can be used in a multi-dimensional matrix symbol in accordance with the present invention.
FIG. 4 is a schematic view of exemplary data cells each having a different grey scale level that can be used in a multi-dimensional matrix symbol in accordance with the present invention.
FIG. 5 is a schematic view of exemplary data cells each having a different shape that can be used in a multi-dimensional matrix symbol in accordance with the present invention.
FIG. 6 is a schematic view of exemplary data cells each having a different geometric pattern that can be used in a multi-dimensional matrix symbol in accordance with the present invention.

Exemplary characteristic features that can be used with multi-dimensional data cells in accordance with the present invention are illustrated in FIGS. 3-6 and include color, grey scale level, shape, and geometric design. In FIG. 3 exemplary data cells 40, 42, 44, and 46 are illustrated. In accordance with the present invention, data cells 40, 42, 44, and 46 each illustrate an exemplary characteristic feature of color. Data cells 40, 42, 44, and 46 are illustrated as square (another characteristic feature in accordance with the present invention) but can have any desired shape or additional characteristic feature(s). In accordance with an aspect of the present invention, data cell 40 is yellow, data cell 42 is green, data cell 44 is red, and data cell 46 is cyan but any desired colors can be used. In FIG. 4 exemplary data cells 48, 50, 52, and 54 are illustrated. In accordance with the present invention, data cells 48, 50, 52, and 54 each illustrate a characteristic feature of grey scale. Data cells 48, 50, 52, and 54 are illustrated as square (another characteristic feature in accordance with the present invention) but can have any desired shape or additional characteristic feature(s). In accordance with an aspect of the present invention, data cell 48 is white and data cell 54 is black while data cells 50 and 52 have grey scales between white and black. In FIG. 5 exemplary data cells 56, 58, 60, and 62 are illustrated. In accordance with the present invention, data cells 56, 58, 60, and 62 each illustrate a characteristic feature of shape. Data cells 56, 58, 60, and 62 are illustrated as white but can have any desired color or additional characteristic feature(s). In accordance with an aspect of the present invention data cell 56 is square, data cell 58 is diamond shaped, data cell 60 is circular, and data cell 62 is pentagon shaped (five sided). In FIG. 6 exemplary data cells 64, 66, 68, and 70 are illustrated. In accordance with the present invention, data cells 64, 66, 68, and 70 each illustrate a characteristic feature of geometric pattern. Data cells 64, 66, 68, and 70 are illustrated with various shapes but can have any desired shape or additional characteristic feature(s). In accordance with an aspect of the present invention data cell 64 comprises a first geometric pattern of spaced apart lines, data cell 66 comprises a second geometric pattern of spaced apart lines, data cell 68 comprises a geometric pattern of concentric circles, and data cell 70 comprises a third geometric pattern of spaced apart lines.

A multi-dimensional symbol in accordance with the present invention can use data cells that comprise any combination of characteristic features. For example, if four different colors, four levels of gray scale, four different shapes, and four different patterns are available for a data cell the number of data bits available per data cell would be 4×4×4×4 or 256 bits of data per cell compared to 2 bits with binary cells (black and white, for example).

Encoding of data in accordance with the present invention can be performed as is done for well known area symbologies, such as those commercially known under the tradenames Vericode™ or Data Matrix™ or Code One™. Exemplary methods for encoding data are described in U.S. patent application Ser. No. 11/121,762, filed on May 3, 2005, and entitled "Methods for Encoding and Decoding Information," the entire disclosure of which is incorporated by reference herein for all purposes. Typically, in these techniques, information is encoded by an appropriate method which includes encoding the information into Reed-Solomon blocks. The data to be encoded is represented by a binary code forming a string of binary codes. A value called a Cyclical Redundancy Check (CRC) is computed based on the string of binary codes. The CRC is appended to the binary string. The CRC is used by the reader to check that decoded information is correct. Next, 64-bit Reed-Solomon block codes are produced based on the binary string. Reed-Solomon codes permit the original data to be recovered even when some of the data has been damaged. Reed-Solomon codes are the basis of the symbol's Error Detection and Correction (EDAC) capability. The bit values from the block codes are preferably interleaved so spot damage to the symbol, caused by dirt or scratches, will be distributed across different blocks and therefore less likely to make the symbol unreadable. A data matrix that contains a plurality of data cells is then generated from the encoded information. Next, the data matrix is converted to a bitmap image, in the form of a symbol, and the image is printed on an object, label, box, etc. For example, symbols of this type are now in common usage in various applications, such as inventory control, point of sale identification, or logistical tracking systems.

The cells may also be organized into groups for convenience. For example, two different organizations inside a single code can be used. The first area is in one or more corners of the symbol and is called the descriptor block. The descriptor block is built from 2×2 cell blocks and organized as 3×3 blocks for a total of 72 bits of data. This field may house information about the code such as the number of cells in the X and Y axis, a CRC number or the encryption key identity used for the code. The data cells are organized as 3×3 cell blocks. The total number of data blocks can be calculated by multiplying the cell count in the X axis times the Y axis and dividing by nine and subtracting 4 or 16 for the descriptor block(s). Note that in the total count the descriptor block and data blocks are included. Both the X axis cells and the Y axis cells are preferably divisible by 3.

Symbols in accordance with the present invention can be made by any appropriate printing or image formation technique. Using color as an example, each cell preferably comprises a color that can be defined in software most likely as red, green, and blue (RGB) components but could also be defined by cyan, magenta, yellow and black (CMYK) components and put in a form that can be sent to a color digital printer or the like. The printer preferably includes the capability of printing that combination of colors so that it can be recognized as a separate color from all the rest that will be used in the matrix. An ink jet printer, where primary color drops are very small and bleed together provides more combinations of discernable colors compared to a laser printer where the spots are larger and just sit on top of each other. Similar techniques can be used for grey-scale, shape, and geometric pattern in accordance with the present invention.

Another feature in printing the code is the use of process colors where the layering of transparent colors allows all features to be seen. Most common printer types such as laser and ink jet use transparent colors.

To read a symbol in accordance with the present invention, the symbol is located in the field of view, the four corners are identified to determine rotation and skew, the matrix is adjusted back to being a rectangle or at least set up horizontal and vertical lines (based on the number of horizontal and vertical cells) that are adjusted for the rotation and skew and the crossing of each line pair where a cell should be is located.

Typically the analysis will start with what is believed to be the most center pixel and weight is given to that pixel moving out and reducing the multiplier averaging while moving away from the center. When pixels are identified that are too far in color from the average they are rejected and not averaged. When a predetermined limit is reached either by the matrix or rejected pixels the average is the color and grey scale component. Shape is determined by looking at color pixels compared to rejected pixels by looking for a shape based on the pattern. Patterns within a cell could be circles radiating out from the center, squares radiating out from the center, triangles radiating out from the center, and other geometric arrangements which provide differing signatures when transforms are applied to the data coming from the matrix.

Typical printed codes and cameras vary from one code or camera to the next and over time so a method of adjusting a camera to recognize each feature at the moment of reading the symbol is provided in accordance with the present invention. The border is preferably set up in a known array of cells (preferably larger than the cells in the matrix) to provide the code reading software with an example of each feature to recalibrate the software algorithm so that the correct data will be output for each feature in the matrix. The border can also use additional features to enhance the determination of rotation and skew. For example a large cell of each primary color and black can be placed in the four corners. The pattern of the large cells identifies orientation while the exact shape of the large cell will be an indicator of skew. If the four corner cells shape data is added to the data from the border cells, each in a known location where alignment is determined and added to the skew found from looking at the four corners, the combined information provides a more accurate picture of non-balanced skew such as lens barreling where the middle of the symbol's four sides rounds outward and trapezoidal problems where the lens is not square with the symbol which is not seen or corrected by just looking at the corners points themselves. A variable cell/s in known location/s on the border can also have information about the symbol such as number of cells on each axis, where to locate the descriptor block, an encryption code and the like.

Conventional area array cameras have unique features that can be utilized to distinguish more than the single feature of being black or white. A typical camera outs 24 bits of information for each element. Normally 8 bits are used for the grey scale of the element and the remaining 16 bits are divided among the three primary colors of red, green and blue (RGB) or the complimentary colors of cyan, magenta, yellow (and black) (CMYK). An aspect of the present invention includes using from one to several differing methods or designs that allow layered information to be extracted from a single cell. Known methods use only two bits of data bits (black or white) from each element while 24 bits are typically available or at most some subset of 4 or 8 colors. Codes in accordance with the present invention use more than 2 bits of data from each element. A cell in accordance with the present invention can be made up of several colors which could include the primary colors and other colors using combinations of the transparent primary colors. Each color within a cell can have varying levels of grey scale differentiating each color by the multiple of the number of levels of grey scale elements within the grey scale feature. Each cell can be designed as a differing shape such as a square, a diamond, a circle or other shapes that are easily distinguished by an array of camera elements. Within a cell various patterns can be created that provide differing response when analyzed with transforms known in optical analysis using an array of camera elements. For printed codes, inks with other characteristics such as infrared, UV, fluorescing, etc can be used as well as the colors, grey scale, shape or pattern to induce a response from a camera element or other device that can be recognized by differentiation from the other features. Symbol cells with differing features can be used to more accurately identify a cell and its exact location. Black cells can become the same color (assuming a two color image—black and white) as unwanted artifacts in the code area and are hard to distinguish from good cells or the borders of good cells while colored cells are less likely to fall into background noise.

Another aspect of the present invention is to place on each code all of the features used for the code in known locations to recalibrate the camera for the code to be read. Redundant placement of features help eliminate problems caused by damage to some of the calibration features and help in averaging the calibration across many inputs. Timing marks in the code can also be made up of differing features that provide additional information as to cell locations or can also be used for added symbol encoding and decoding. Calibration features can be placed, for example, on four borders of a symbol to set the color values, the grey scale values, the shape signature, the transform signature and whatever other features are used and the value or signature they provide can be used to more accurately calibrate the cell reading values. A four border analysis of features can also show differences between known features at comparative positions allowing correction to rotation, skewing and illumination problems based on the comparative data. Because a border can have differing elements in known locations, locating the code in the field of view becomes more accurate and reliable. Timing cells with differing features can be used to more accurately identify timing marks and their exact location. Presently, black cells are the same color (assuming a two color image—black and white) as unwanted artifacts in the code area and are hard to distinguish from good cells. While a border is given as an example, many schemes of locating the calibration features could be utilized such a stacking the features on one border, locating the features in box areas on the four corners of the code and many other methods in accordance with these aspects of the present invention.

Another feature of the present invention is the utilization of an array area camera that can read multi-dimensional symbology codes of the present invention. While camera hardware used can be typical of CCD, CMOS or other technologies sold in the market place today, camera adjustments, firmware, software, drivers and other control methods are preferably optimized to read multi-dimensional symbology codes of the present invention preferably using one or more of the features described herein.

The present invention has now been described with reference to several embodiments thereof. The entire disclosure of any patent or patent application identified herein is hereby incorporated by reference. The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the structures described herein, but only by the structures described by the language of the claims and the equivalents of those structures.

What is claimed is:

1. A multi-dimensional matrix symbol comprising a first plurality of data cells wherein at least one data cell of the first plurality of data cells comprises plural characteristic features and each characteristic feature represents an encoded data bit wherein the first plurality of data cells are arranged in an internal data field and the symbol further comprises a data cell border comprising a second plurality of data cells surrounding the internal data field, the second plurality of data cells including at least one binary data cell.

2. The multi-dimensional matrix symbol of claim 1, wherein a characteristic feature comprises one of color, grey scale level, shape, and geometric pattern.

3. The multi-dimensional matrix symbol of claim 1, wherein at least one data cell of the data cell border comprises plural characteristic features and each characteristic feature represents an encoded data bit.

4. The multi-dimensional matrix symbol of claim 3, wherein a characteristic feature comprises one of color, grey scale level, shape, and geometric pattern.

5. A multi-dimensional matrix symbol comprising an internal data field comprising a first plurality of data cells and a data cell border comprising a second plurality of data cells wherein at least one data cell of the first plurality of data cells comprises a binary data cell and wherein at least one data cell of the second plurality of data cells comprises plural characteristic features and each characteristic feature represents an encoded data bit.

6. The multi-dimensional matrix symbol of claim 5, wherein a characteristic feature comprises one of color, grey scale level, shape, and geometric pattern.

7. A method of reading a multi-dimensional matrix symbol, the method comprising the steps of:
providing a multi-dimensional matrix symbol comprising a first plurality of data cells wherein at least one data cell of the first plurality of data cells comprises plural characteristic features and each characteristic feature represents an encoded data bit wherein the first plurality of data cells are arranged in an internal data field and include at least one binary data cell and wherein the symbol further comprises a data cell border comprising a second plurality of data cells surrounding the internal data field;
identifying each characteristic feature of each data cell; and
decoding the data represented by each characteristic feature.

8. The method of claim 7, wherein a characteristic feature comprises one of color, grey scale level, shape, and geometric pattern.

9. The method of claim 7, further comprising locating the symbol by identifying at least a portion of the data cell border.

10. The method of claim 7, further comprising orienting the symbol by identifying at least a portion of the data cell border.

11. A method of reading a multi-dimensional matrix symbol, the method comprising the steps of:
providing a multi-dimensional matrix symbol comprising an internal data field comprising a first plurality of binary data cells and a data cell border comprising a second plurality of multi-dimensional data cells wherein at least one data cell of the second plurality of data cells comprises plural characteristic features and each characteristic feature represents an encoded data bit;
decoding data represented by the first plurality of binary data cells;
identifying each characteristic feature of each data cell of the second plurality of data cells; and
decoding the data represented by each characteristic feature.

12. The method of claim 11, wherein a characteristic feature comprises one of color, grey scale level, shape, and geometric pattern.

13. The method of claim 11, further comprising locating the symbol by identifying at least a portion of the data cell border.

14. The method of claim 11, further comprising orienting the symbol by identifying at least a portion of the data cell border.

15. A multi-dimensional matrix symbol comprising an internal data field comprising a first plurality of binary data cells and a data cell border comprising a second plurality of multi-dimensional data cells wherein at least one data cell of the second plurality of data cells comprises plural characteristic features and each characteristic feature represents an encoded data bit.

16. The matrix symbol of claim 15, wherein a characteristic feature comprises one of color, grey scale level, shape, and geometric pattern.

17. The matrix symbol of claim 15, wherein the data cell border comprises at least one binary data cell.

* * * * *